(12) United States Patent
Bourdeau

(10) Patent No.: US 6,738,429 B1
(45) Date of Patent: May 18, 2004

(54) DECISION-DIRECTED CARRIER FREQUENCY DETECTOR AND METHOD FOR QAM

(75) Inventor: Richard Bourdeau, St-Laurent (CA)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/323,211

(22) Filed: Jun. 1, 1999

(51) Int. Cl.[7] .................................................. H03L 7/00
(52) U.S. Cl. ...................................................... 375/261
(58) Field of Search ................................ 375/362, 320, 375/322, 323, 333, 298, 375, 261, 201, 374, 344, 326, 327, 340; 329/306, 307, 370, 308, 309; 339/25

(56) References Cited

U.S. PATENT DOCUMENTS

| 4,308,505 A | * | 12/1981 | Messerschmitt | 331/25 |
|---|---|---|---|---|
| 4,682,111 A | | 7/1987 | Hughes | |
| 4,687,999 A | * | 8/1987 | Desperben et al. | 329/109 |
| 4,803,705 A | | 2/1989 | Gillingham et al. | |
| 4,916,405 A | * | 4/1990 | Keate et al. | 329/308 |
| 4,958,360 A | * | 9/1990 | Sari | 375/97 |
| 5,042,052 A | * | 8/1991 | Roberts et al. | 375/97 |
| 5,373,247 A | | 12/1994 | Furukawa et al. | |
| 5,497,400 A | | 3/1996 | Carson et al. | |
| 5,519,733 A | * | 5/1996 | Huang | 375/326 |
| 5,533,062 A | | 7/1996 | Liberti, Jr. et al. | |
| 5,541,965 A | | 7/1996 | Daffara | |
| 5,563,921 A | * | 10/1996 | Mesuda et al. | 375/376 |
| 5,572,550 A | | 11/1996 | Park | |
| 5,581,582 A | | 12/1996 | Choi | |
| 5,594,389 A | | 1/1997 | Kiyanagi et al. | |
| 5,602,835 A | * | 2/1997 | Seki et al. | 370/206 |
| 5,612,976 A | | 3/1997 | Granger-Jones | |
| 5,625,652 A | * | 4/1997 | Petranovich | 375/355 |
| 5,633,898 A | | 5/1997 | Kishigami et al. | |
| 5,657,355 A | * | 8/1997 | Reusens | 375/340 |
| 5,696,797 A | | 12/1997 | Bucher et al. | |
| 5,796,787 A | * | 8/1998 | Chen et al. | 375/326 |
| 5,809,096 A | * | 9/1998 | Martinez et al. | 375/375 |
| 5,872,812 A | * | 2/1999 | Saito et al. | 375/261 |
| 6,055,286 A | | 4/2000 | Wu et al. | |
| 6,160,860 A | * | 12/2000 | Larsson | 375/376 |
| 6,493,409 B1 | * | 12/2002 | Lin et al. | 375/375 |

FOREIGN PATENT DOCUMENTS

JP         610559949         3/1986

OTHER PUBLICATIONS

Benani, A. Mouki & Gagnon, F., "Comparison of Carrier Recovery Techniques in M–QAM Digital Communication Systems", pp. 73–77, 2000 Canadian Conference on Electrical and Computer Engineering, IEEE. vol. 1, Mar. 7–10, 2000.

Sari, H. and Moridi, S., *New Phase and Frequency Detectors for Carrier Recovery in PSK and QAM Signal Sets*, IEEE Transactions in Communications, vol. 36 #9. Pp. 1035–1043, Sep. 1988.

\* cited by examiner

Primary Examiner—Mohammad H. Ghayour
Assistant Examiner—Dung X. Nguyen
(74) Attorney, Agent, or Firm—Duane Morris LLP

(57) ABSTRACT

A decision directed frequency detector and method for a quadrature amplitude modulated signal (QAM) demodulator. The demodulator interacts with a voltage controlled oscillator (VCO) that generates a carrier signal to demodulate the QAM signal into a baseband signal. The frequency detector determines the direction of rotation of the baseband signal by sampling the baseband signal relative to predetermined points in the phase plane. For example, if one sample has a negative phase offset with respect to a predetermined point and the next one has a positive phase offset, it detects that the rotation is clockwise, and vice-versa. A control signal is supplied to the VCO and the frequency of the carrier signal is adjusted to stop the rotation of the baseband signal.

18 Claims, 4 Drawing Sheets

DECISION-DIRECTED CARRIER FREQUENCY DETECTOR AND METHOD FOR QAM

BACKGROUND OF THE INVENTION

The present invention relates to a communication system that performs digital data transmission using quadrature amplitude modulation (QAM). The QAM signal is received at a receiving unit and demodulated in order to obtain the digital data. The demodulator typically includes a carrier signal that is synchronized with the QAM signal. The carrier signal is typically generated by a voltage controlled oscillator (VCO).

The carrier signal is used to quadrature-demodulate the signal and generate baseband signals. The baseband signals typically comprise an I-phase signal and a Q-phase signal. The I-phase and Q-phase signals are amplified and converted to digital output signals that may be plotted in a phase plane with predetermined coordinates. For example, in a 64-QAM there are 64 lattice points, 8 points horizontally and 8 points vertically. The amplitude of the I-phase baseband signal is plotted along the horizontal axis and the amplitude of the Q-phase baseband signal is plotted along the vertical axis.

A phase comparator generates an error signal based on the phase error between the baseband signals. The error signal is filtered and applied as a control signal to the VCO. The frequency of the carrier signal generated by the VCO is adjusted in order to rotate the baseband signals into coincidence with the predetermined lattice points in the phase plane. The Park U.S. Pat. No. 5,572,550 dated Nov. 5, 1996 ("Park") discloses a decision directed carrier recovery circuit as described above and the disclosure thereof is incorporated by reference herein.

It is not uncommon for a communications system to experience a sudden break in communications. When this happens, the carrier signal may be thrown out of synchronization with the modulated data carrying communications signal. The baseband signal rotates about the origin of the phase plane, and the VCO begins to oscillate about the frequency midway between the frequency of the modulated signal and the carrier signal. Once synchronization is broken, restoration generally requires some intervention. The carrier signal must be brought back into synchronization quickly to avoid the loss of data.

Previous systems typically used a sweeper to establish synchronization between the signals. The sweeper was activated when an out-of-synchronization condition was detected and caused the frequency of the VCO to slowly "sweep" over a predetermined capture range until the phases were matched. Once the phases were synchronized the sweeper was stopped and normal operation of the system was resumed. The time required to reestablish synchronization depended on the sweeper speed. A sweeper operating with a cycle of between several hundred milliseconds to several seconds could take up to several seconds to reestablish synchronization.

The Kiyanagi U.S. Pat. No. 5,594,389 dated Jan. 14, 1997 ("Kiyanagi") discloses an area judging device for providing a signal that indicates whether the baseband signal lies inside a predetermined area in the phase plane, and the disclosure thereof is incorporated by reference herein. Just before the baseband signal rotates out of the designated area a control signal is generated to force the baseband signal in the opposite direction of rotation. Kiyanagi also discloses holding circuits for maintaining the control signal constant until the baseband signal returns to the designated area by such counter-rotation.

The area system is complex and more difficult to implement than the sweeper system and there remains a need for a simple decision directed system that is capable of quickly restoring synchronization between the carrier signal and the QAM signal.

OBJECTS OF THE INVENTION

Accordingly, it is an object of the present invention to provide a novel QAM communication system and method with a demodulator that can quickly resynchronize the carrier signal with the data carrying QAM signal.

It is another object of the present invention to provide a novel QAM demodulator and method that includes a decision-directed carrier frequency detector for a voltage controlled oscillator.

It is another object of the present invention to provide a novel QAM demodulator and method that includes a decision-directed carrier frequency detector for a numerically controlled oscillator.

It is still another object of the present invention to provide a novel alternative to a VCO frequency sweeper system and method.

It is yet another object of the present invention to provide a novel alternative to an area judging system and method.

It is a further object of the present invention to provide a novel decision directed carrier frequency detector and method that can be used with existing QAM demodulation systems.

It is still a further object of the present invention to provide a cost effective alternative to a VCO frequency sweeper QAM demodulator system and method.

These and many other objects and advantages of the present invention will be readily apparent to one skilled in the art to which the invention pertains from a perusal of the claims, when read in conjunction with the appended drawings and the following detailed description of a preferred embodiment.

DETAILED DESCRIPTION OF A PREFERRED EMBODIMENT

Figure 1:
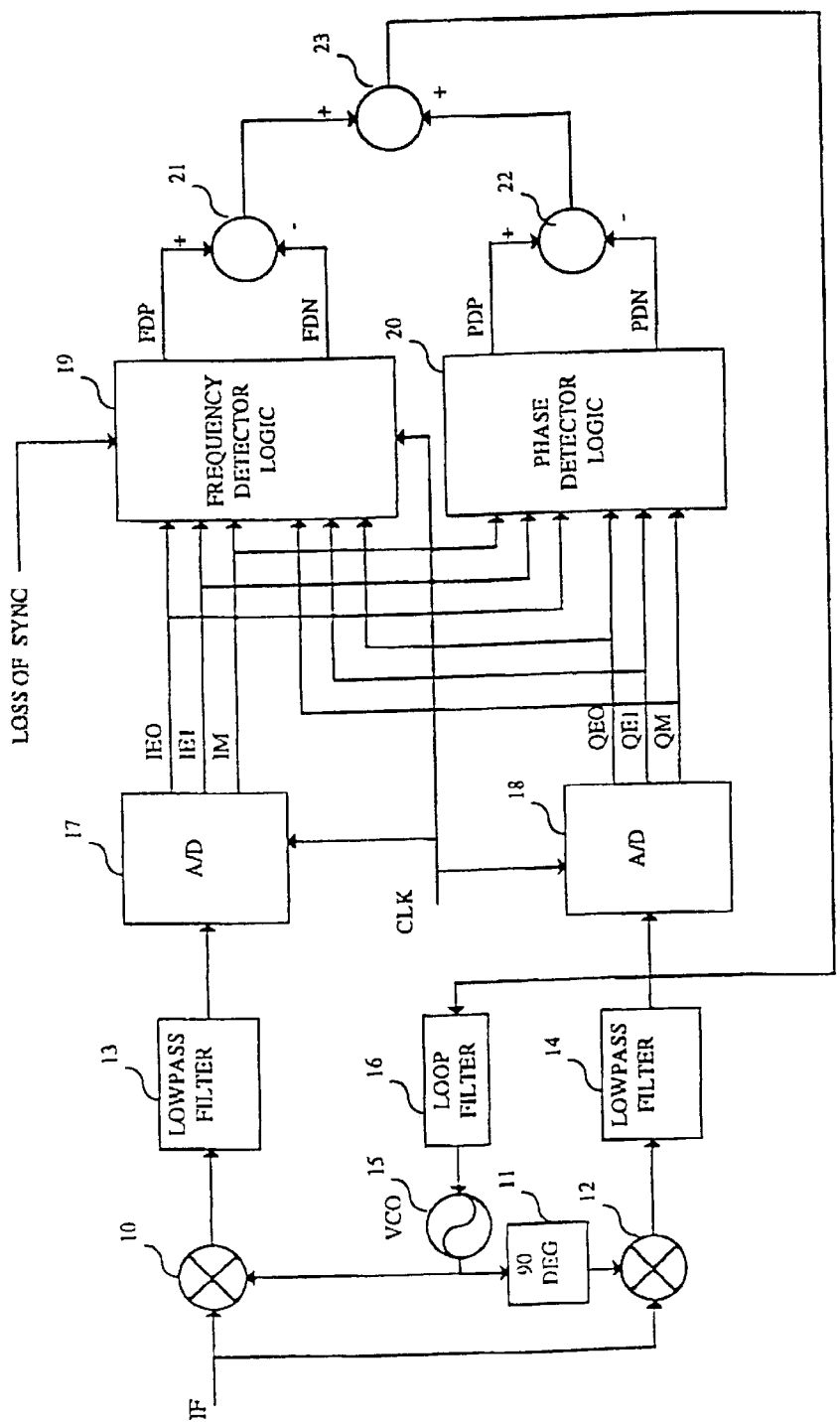
FIG. 1 is a block diagram of one embodiment of the QAM demodulation circuit of the present invention.

With reference to the communication system of FIG. 1, the incoming QAM signal IF is provided to suitable conventional mixers 10 and 12. Mixers 10 and 12 and 90 degree hybrid mixer 11 form a standard QAM demodulator. The demodulator produces output signals I and Q from the carrier signal which are applied respectively to the conventional low pass filters 13 and 14 to remove noise from the signals. The filtered signals are next applied respectively to analog to digital (A/D) converters 17 and 18.

The output signals from the A/D converters are provided to the frequency detector logic circuit 19 and the phase detector logic circuit 20. Each of the detectors may have differential output signals. The frequency detector 19 may produce two digital output signals: Frequency Difference Positive (FDP) and Frequency Difference Negative (FDN). The phase detector 20 may include a decision directed circuit and produces digital output signals for Phase Difference Positive (PDP) and Phase Difference Negative (PDN).

The differential output signals from the frequency detector 19 and the phase detector 20 are applied to conventional subtractors 21 and 22 respectively. Each of the subtractors provides a signal with three possible values (+, – or 0). The output signals from the two subtractors are added by a conventional adder 23 and provided to loop filter 16. The filtered signal is provided to the VCO 15 to adjust the carrier signal frequency into synchronization with the frequency of the received IF signal.

Figure 2:
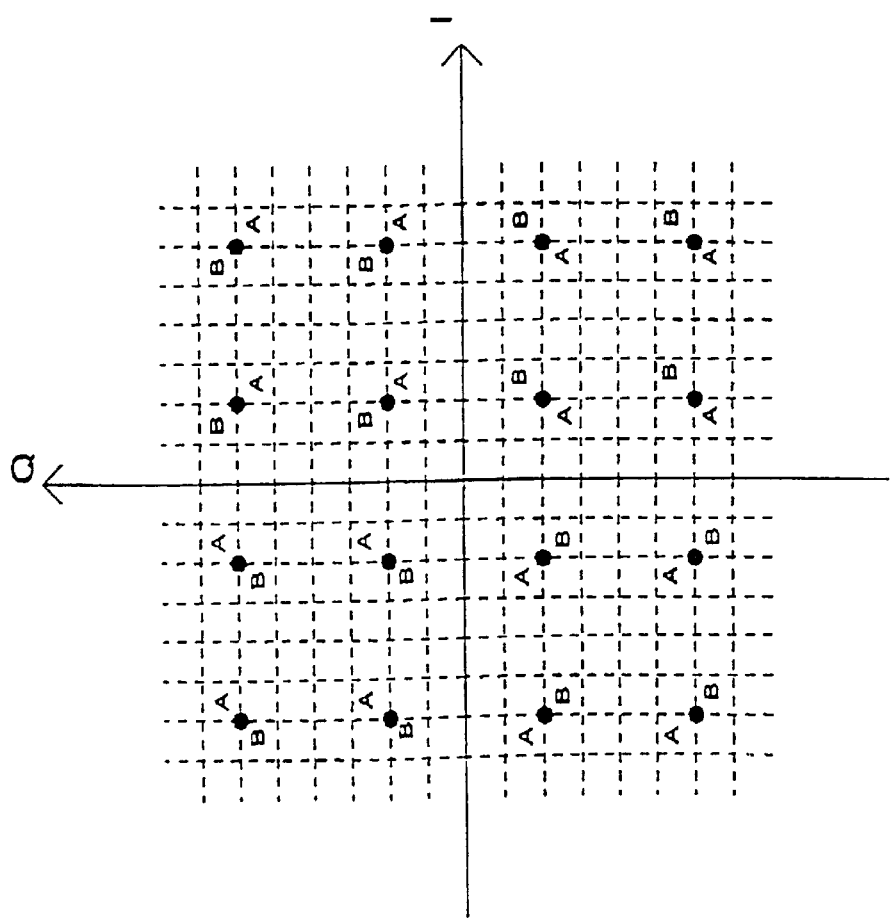
FIG. 2 is a diagram of the phase plane of a 16 QAM constellation.

The baseband signals produced by the A/D converters 17 and 18 of FIG. 1 may be plotted in a phase plane. FIG. 2 illustrates a 16 QAM constellation plotted in a two dimensional phase plane. Similar constellations can be obtained for other QAM modulation schemes, for example, a plot of a 32 QAM signal will have 32 points in its constellation. A point of the constellation may be referred to by a symbol that has as its coordinates (x,y) the amplitude of the I and Q phase signals respectively.

When the demodulator is out of synchronization, the VCO 15 is not generating a carrier signal at a frequency equal to the frequency of the incoming IF signal. The frequency detector logic circuit 19 will detect the direction that the VCO 15 has to be steered (increase or decrease frequency), and that correction is applied to the VCO 15. When the demodulator is synchronized (i.e. the frequency of the carrier signal and the IF signal are matched) the "Loss of Synch" signal is used to disable the frequency detector logic circuit 19. In this case, the FDP and FDN are both equal to 0.

Each symbol of the constellation is surrounded by four quadrants, two of which may be designated A and B as shown in FIG. 2. The frequency detector 19 can detect whether a symbol is in the A or B region.

The direction of constellation rotation is detected by determining the location of a constellation point at sequential times. The baseband signal is sampled at two consecutive points in time, and two symbols are obtained. If a particular symbol is in the A region (as shown in FIG. 2) and the previous symbol was in the B region, it can be determined that the baseband constellation is rotating clockwise and that the frequency of the carrier signal is too low. A control signal is then generated to control the VCO 15, and raise the frequency of the carrier signal.

For each sample of the I and Q phase signals the E1, E0 and M bits are obtained. Starting from the most significant bit produced by the A/D converters 17 and 18, the error bits E1 and E0 for the I and Q baseband signals are: bits numbered 3 and 4 for a 4-QAM signal; bits numbered 4 and 5 for 16-QAM; bits numbered 5 and 6 for a 32 or 64 QAM; and bits numbered 6 and 7 for a 128 or 256 QAM. The M bit is numbered 2 for all modulation patterns.

When the logic circuit 19 detects a transition from the A to B region, FDN is high and the loop filter 16 output signal and the frequency produced by the VCO 15 both decrease. Similarly, when the logic circuit 19 detects a transition from the B to A regions, FDP is high and the loop filter 16 output signal and the frequency of the VCO 15 both increase. In any other case, both FDP or FDN are low.

Figure 3:
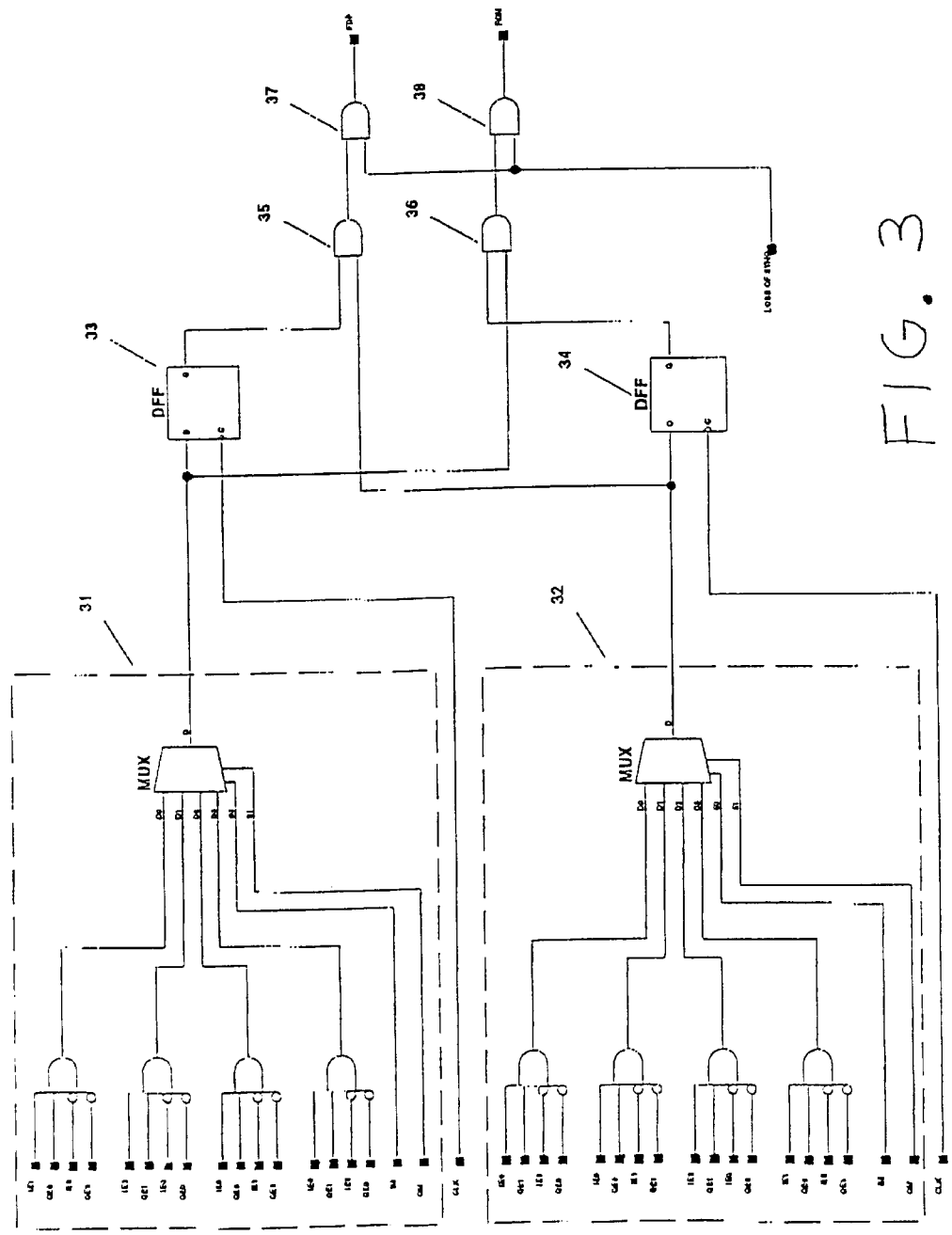
FIG. 3 is a block diagram of a portion of the frequency detector logic circuit of FIG. 1.

FIG. 3 illustrates the frequency detector logic circuit 19 disclosed in FIG. 1. The circuit 19 includes two groups of logic elements 31 and 32. Both groups comprise several AND gates and a MUX gate. The logic elements in group 31 detect the location of a constellation point, and produce an output signal equal to 1 if the point is inside the B region. Similarly, the logic elements in group 32 detect the location of a constellation point, and produce an output signal equal to 1 if the point is in the A region. The logic circuit 19 also includes conventional flip-flops 33 and 34. Flip-flop 33 stores the previous state of the output signal for the group 31 elements, and flip-flop 34 stores the previous state of the output signal for the group 32 elements.

The logic circuit 19 also includes AND gates 35, 36, 37, and 38. The circuit 19 operates so that when the present constellation point is in the A region, and the previous constellation point was in the B region, the output signals of group 32 and flip-flop 33 will be high. As a result, the output signal of gate 35 will be in a high state as will the output signal (FDP) of gate 37.

The detector circuit 19 also includes a "Loss of Synch" signal. The "Loss of Synch" signal is used to disable the frequency detector 19. The "Loss of Synch" signal must be high for the frequency detector 19 to operate. When the demodulator is synchronized, the "Loss of Synch" signal is in a low state and both output signals FDP and FDN are in a low state.

Figure 4:
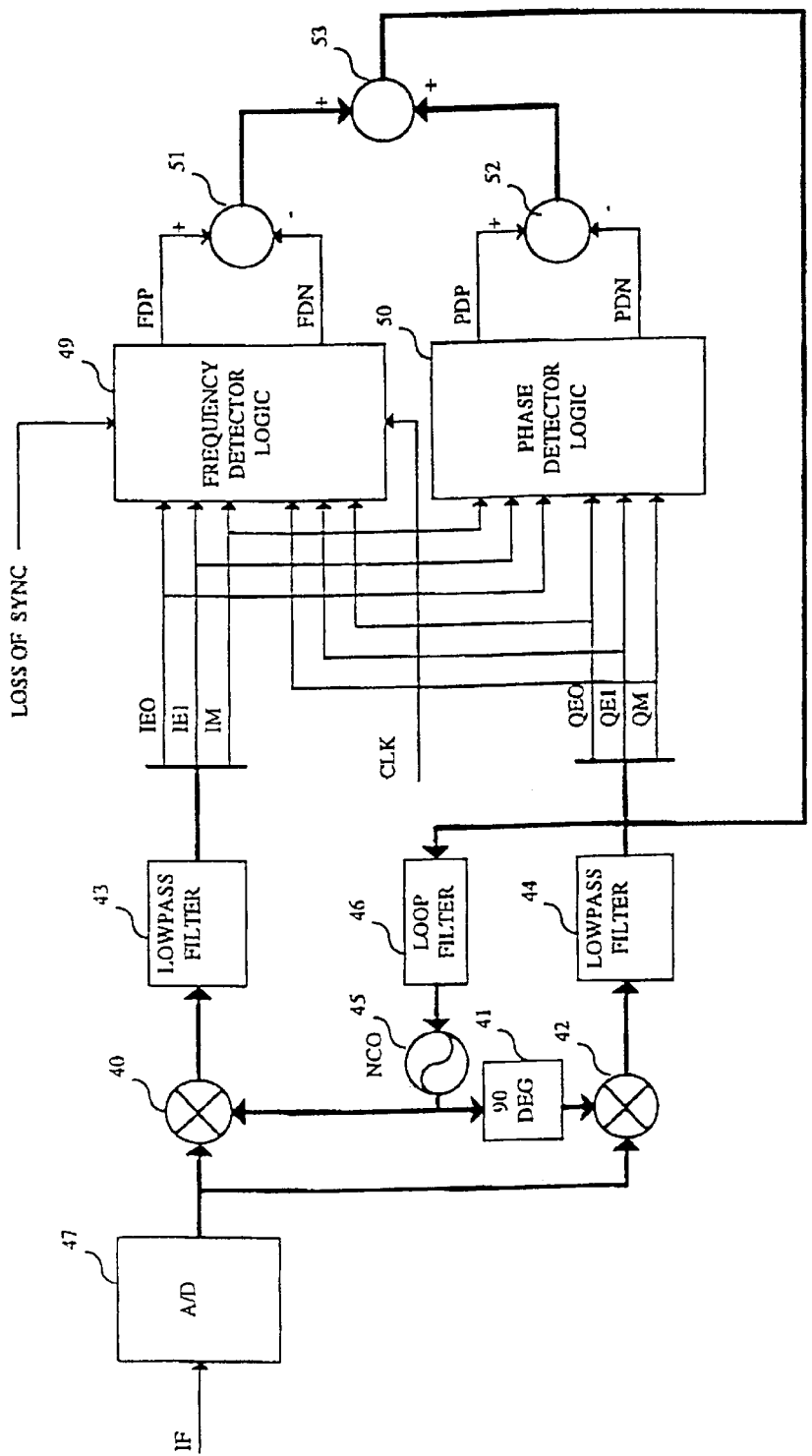
FIG. 4 is a block diagram of another embodiment of the QAM demodulation circuit of the present invention.

As illustrated in FIG. 4, the demodulator of the present invention may be digitally implemented. The system of FIG. 4 includes an A/D converter 47 that converts the incoming IF signal to a digital signal which is demodulated in mixers 40, 42 and 90 degree hybrid 41 mixer using a carrier signal produced by a numerically controlled oscillator (NCO) 45.

The mixers 40, 41 and 42 produce output signals I and Q. The output signals are passed through lowpass filters 43 and 44 to remove noise from the signals and are applied respectively to the frequency and phase detectors 49 and 50. The mixers, filters and detectors may be the same as those disclosed in FIG. 1. The frequency detector 49 produces digital output signals FDP and FDN and the phase detector 50 produces digital output signals PDP and PDN.

The differential output signals from the frequency detector 49 and the phase detector 50 are applied to subtractors 51 and 52 respectively. Each subtractor provides a signal with three possible values +, – or 0. The output signals from the two subtractors are provided to the adder circuit 53 and the output signal from adder 53 is provided to a loop filter 46. The filtered signal is provided to the NCO 45 to synchronize the carrier signal frequency with of the received QAM signal.

The NCO 45 functions similarly to VCO 15 described above. When the demodulator is out of synchronization, the NCO 45 does not operate at a frequency equal to the carrier frequency of the incoming IF signal. The frequency detector logic circuit 49 detects the direction in which the NCO 45 must be steered to match the IF signal frequency. A corrective signal is then applied to the NCO 45. When the demodulator is synchronized, the "Loss of Synch" signal is low and the frequency detector logic circuit 49 is disabled (i.e. FDP and FDN are equal to 0).

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

I claim:

1. In a communication system that performs data transmission using a quadrature amplitude modulated (QAM) signal comprising a controlled oscillator for generating a carrier signal, a demodulator for generating a baseband signal by demodulating the QAM signal with the carrier signal, a frequency detector comprising means for determining the direction of rotation of the baseband signal in a phase plane, and means for generating a control signal for said controlled oscillator to change the frequency of the carrier signal to match the frequency of the QAM signals, the improvement wherein said means for determining the direction of rotation of the baseband signal includes means for obtaining a phase difference from two samples of the baseband signal obtained at successive points in time, based on sample locations in different symbol quadrants, wherein the symbol quadrants are located adjacent to a QAM symbol in a quadrant of the phase plane, and the frequency detector comprises a logic circuit, wherein said means for determining the direction of rotation produces a frequency difference positive (FDP) signal and a frequency difference negative (FDN) signal.

2. The system of claim 1, wherein said frequency detector further comprises means for implementing a decision-directed algorithm to detect the frequency of the carrier signal.

3. The system of claim 1, wherein the controlled oscillator includes means for reducing the frequency of the carrier signal when the frequency detector determines that the baseband signal is rotating counter clockwise.

4. The system of claim 1, wherein the controlled oscillator includes means for raising the frequency of the carrier signal when the frequency detector determines that the base band signal is rotating clock wise.

5. The system of claim 1, wherein said controlled oscillator comprises a voltage controlled oscillator.

6. The system of claim 1, wherein said controller oscillator comprises a numerically controlled oscillator.

7. The system of claim 1, further comprising a loop filter between said frequency detector and said controlled oscillator for filtering out the high frequency components of the control signal prior to the voltage controlled oscillator.

8. The system of claim 1, further comprising means for disabling the frequency detector when the carrier signal and the QAM signal are synchronized.

9. The system of claim 1, further comprising a differential amplifier between said frequency detector and said controlled oscillator, wherein said differential amplifier has as its input signals said FDN and FDP signals, and wherein the output signals of said differential amplifier is low when said FDN signal is high, and the output is high when said FDP is high.

10. A method for facilitating the retrieval of data from a quadrature amplitude modulated (QAM) communications signal comprising the steps of:

(a) generating a carrier signal;
(b) providing the generated carrier signal to a demodulator;
(c) demodulating the QAM signal to provide a baseband signal comprising a constellation of symbols;
(d) determining if there is rotation of the constellation; and,
(e) adjusting the frequency of the carrier signal to reduce any determined rotation of the constellation, thereby synchronizing the QAM signal with the carrier signal to facilitate the retrieval of data;

wherein said step of determining the direction of rotation includes sampling the baseband signal at two consecutive moments in time, in which said step of determining further includes the step of calculating the phase difference from two samples of the baseband signal based on sample locations in different symbol quadrants, wherein the symbol quadrants are located adjacent to a QAM symbol in a quadrant of the phase plane, including the step of generating a control signal for the oscillator after the direction of rotation has been determined.

11. The method of claim 10, wherein said step of adjusting the frequency of the carrier signal comprises controlling the voltage of a voltage controlled oscillator.

12. The method of claim 10, wherein said step of adjusting the frequency of the carrier signal comprises controlling a numerically controlled oscillator.

13. The method of claim 10, wherein said step of determining further includes the step of calculating the frequency difference between the two samples of the baseband signal.

14. The method of claim 10, further comprising the step of generating a control signal for the oscillator after the direction of rotation has been determined.

15. The method of claim 14, further comprising the step of discontinuing the control signal when the QAM signal and the carrier signal are synchronized.

16. The method of claim 10, wherein said step of adjusting the frequency of the carrier signal includes raising the frequency of the carrier signal when the constellation is rotating clockwise.

17. The method of claim 10, wherein said step of adjusting the frequency of the carrier signal includes lowering the frequency of the carrier signal when the constellation is rotating counter clockwise.

18. In a QAM communication system requiring synchronization of a demodulator carrier signal and a QAM signal to retrieve the digital data represented by the QAM signal, the improvement wherein the decision to increase or decrease the frequency of the carrier signal is a function of the direction of rotation of a baseband signal in a phase plane as determined by a difference in phase location with respect to symbol quadrants of successive samples of the baseband signal.

* * * * *